US011973794B1

(12) United States Patent
Levi et al.

(10) Patent No.: US 11,973,794 B1
(45) Date of Patent: Apr. 30, 2024

(54) TECHNIQUE AND METHOD FOR DETECTION AND DISPLAY OF THE CYBERSECURITY RISK CONTEXT OF A CLOUD ENVIRONMENT

(71) Applicant: Wiz, Inc., New York, NY (US)

(72) Inventors: Tomer Gil Levi, Kfar Sava (IL); Yinon Costica, Tel Aviv (IL); Ben Grynhaus, Tel Aviv-Jaffa (IL); Itai Yosephi, Herzliya (IL); Oron Noah, Geulim (IL); Eyal Wiener, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/498,898

(22) Filed: Oct. 31, 2023

(51) Int. Cl.
*H04L 9/40* (2022.01)
*G06F 16/953* (2019.01)

(52) U.S. Cl.
CPC ........ *H04L 63/1433* (2013.01); *G06F 16/953* (2019.01)

(58) Field of Classification Search
CPC .......................... H04L 63/1433; G06F 16/953
See application file for complete search history.

(56) References Cited

U.S. PATENT DOCUMENTS

| 10,868,827 | B2 * | 12/2020 | Davidson | ............... G06F 21/577 |
| 11,675,974 | B2 * | 6/2023 | Trivedi | ................. G06F 40/221 |
| | | | | 705/39 |
| 2015/0222649 | A1 * | 8/2015 | Zeng | ..................... G06F 16/951 |
| | | | | 726/22 |
| 2023/0156024 | A1 * | 5/2023 | Olson | ................ G06Q 30/0248 |
| | | | | 726/23 |
| 2023/0247039 | A1 * | 8/2023 | Luttwak | .............. H04L 63/1425 |
| | | | | 726/23 |
| 2023/0247040 | A1 * | 8/2023 | Luttwak | .............. H04L 63/1416 |
| | | | | 726/22 |
| 2023/0388352 | A1 * | 11/2023 | Gilad | .................. H04L 63/1416 |

FOREIGN PATENT DOCUMENTS

| CN | 204836205 | U | * | 12/2015 | |
| CN | 114510389 | A | * | 5/2022 | |
| CN | 115603974 | A | * | 1/2023 | |
| KR | 20230019664 | A | * | 2/2023 | ............... H04L 9/40 |

* cited by examiner

*Primary Examiner* — Sarah Su
(74) *Attorney, Agent, or Firm* — M&B IP Analysts, LLC

(57) ABSTRACT

A technique and method for detection and display of the cybersecurity risk context of a cloud environment initiates an inspection of cybersecurity objects within a cloud environment utilizing an inspection environment and stores information pertaining to discovered cybersecurity objects within the inspected cloud environment in a storage environment. The technique and method further generate a cybersecurity risk context for the inspected cloud environment based on the observations made concerning the cybersecurity objects contained within it. The technique and method further configure a web browser running on a client device to automatically display the generated cybersecurity risk context to a user, either through a web page overlay or through a toolbar plugin which has been installed in the web browser and configured to enable inspections of a cloud environment, once the user has navigated to a web page containing cybersecurity object identifiers.

19 Claims, 9 Drawing Sheets

TECHNIQUE AND METHOD FOR DETECTION AND DISPLAY OF THE CYBERSECURITY RISK CONTEXT OF A CLOUD ENVIRONMENT

TECHNICAL FIELD

The present disclosure relates generally to cybersecurity and specifically to the detection and display of cybersecurity risks within a cloud environment utilizing non-invasive scanning techniques.

BACKGROUND

Cloud environments are capable of scaling to fit an indeterminate amount of deployed assets, thereby becoming appealing to organizations that wish to maintain flexibility in asset provision efforts and realize cost savings by only utilizing hardware and software they need when they need it. This is capable thanks to infrastructure such as that provided by Microsoft® Azure, Amazon® Web Services (AWS), Google® Cloud Platform (GCP), and the like.

Because of this dynamic nature, it can be difficult to completely grasp the scope of assets deployed within a cloud environment; notably the interconnectedness of deployed assets and the resulting network pathways they form.

Organizations, therefore, often struggle to identify risk profiles associated with a particular cloud environment.

It is difficult for a human to accurately maintain a register of assets present in a cloud environment and their various interconnected points of communication due to the dynamic nature of cloud-based hardware and software.

Furthermore, technologies that currently exist to assist humans with identifying asset risk associated with organizational cloud environments often require invasive measures be taken; these measures including installation of permanent agents, the running of resource intensive monitoring tools as services or daemons, configuration of a system, process, or service tasked with generating security alerts and incident reports when appropriate, a combination thereof, and the like.

These various risk mitigation measures often have an additional cost; being costly themselves to maintain, both financially and from a human capital perspective, and are often deployed as SaaS solutions which can quickly increase monthly infrastructure expenses.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting in a web page a plurality of identifiers, each identifier corresponding to a cloud entity deployed in a cloud computing environment. Method may also include initiating a query for a security database based on an identifier of the plurality of identifiers, where the security database includes a representation of the cloud computing environment. Method may furthermore include executing the query on the security database to return a response, where the response includes a cybersecurity risk. Method may in addition include rendering a representation of the cybersecurity risk on a display associated with the web page based on the response. Other embodiments of this aspect include corresponding computer systems, apparatus, and computer programs recorded on one or more computer storage devices, each configured to perform the actions of the methods.

Implementations may include one or more of the following features. Method may include: rendering the representation of the cybersecurity risk on a security toolbar. Method may include: rendering the representation of the cybersecurity risk as a webpage overlay. Method may include: determining a remediation action based on the cybersecurity risk. Method may include: initiating the remediation action in the cloud computing environment. Method may include: extracting a data field value associated with an identifier of the plurality of identifiers. Method may include: generating the query based on the extracted data field value. Method may include: configuring a client device displaying the web page to install an extension, where the extension is configured to perform detecting in the web page the plurality of identifiers. Method may include: generating the query based on a first identifier of the plurality of identifiers, where the query includes a filter based on a second identifier of the plurality of identifiers. Implementations of the described techniques may include hardware, a method or process, or a computer tangible medium.

In one general aspect, non-transitory computer-readable medium may include one or more instructions that, when executed by one or more processors of a device, cause the device to: detect in a web page a plurality of identifiers, each identifier corresponding to a cloud entity deployed in a cloud computing environment. Medium may furthermore initiate a query for a security database based on an identifier of the plurality of identifiers, where the security database includes a representation of the cloud computing environment. Medium may in addition execute the query on the security database to return a response, where the response includes a cybersecurity risk. Medium may moreover render a representation of the cybersecurity risk on a display associated with the web page based on the response. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: detect in a web page a plurality of identifiers, each identifier corresponding to a cloud entity deployed in a cloud computing environment.

System may in addition initiate a query for a security database based on an identifier of the plurality of identifiers, where the security database includes a representation of the cloud computing environment. System may moreover execute the query on the security database to return a response, where the response includes a cybersecurity risk. System may also render a representation of the cybersecurity risk on a display associated with the web page based on the response. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: render the representation of the cybersecurity risk on a security toolbar. System where the memory contains further instructions which when executed by the processing circuitry further configure the system to: render the representation of the cybersecurity risk as a webpage overlay. System where the memory contains further instructions which when executed by the processing circuitry further configure the system to: determine a remediation action based on the cybersecurity risk. System where the memory contains further instructions which when executed by the processing circuitry further configure the system to: initiate the remediation action in the cloud computing environment. System where the memory contains further instructions which when executed by the processing circuitry further configure the system to: extract a data field value associated with an identifier of the plurality of identifiers. System where the memory contains further instructions which when executed by the processing circuitry further configure the system to: generate the query based on the extracted data field value. System where the memory contains further instructions which when executed by the processing circuitry further configure the system to: configure a client device displaying the web page to install an extension, where the extension is configured to perform detecting in the web page the plurality of identifiers. System where the memory contains further instructions which when executed by the processing circuitry further configure the system to: generate the query based on a first identifier of the plurality of identifiers, where the query includes a filter based on a second identifier of the plurality of identifiers. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
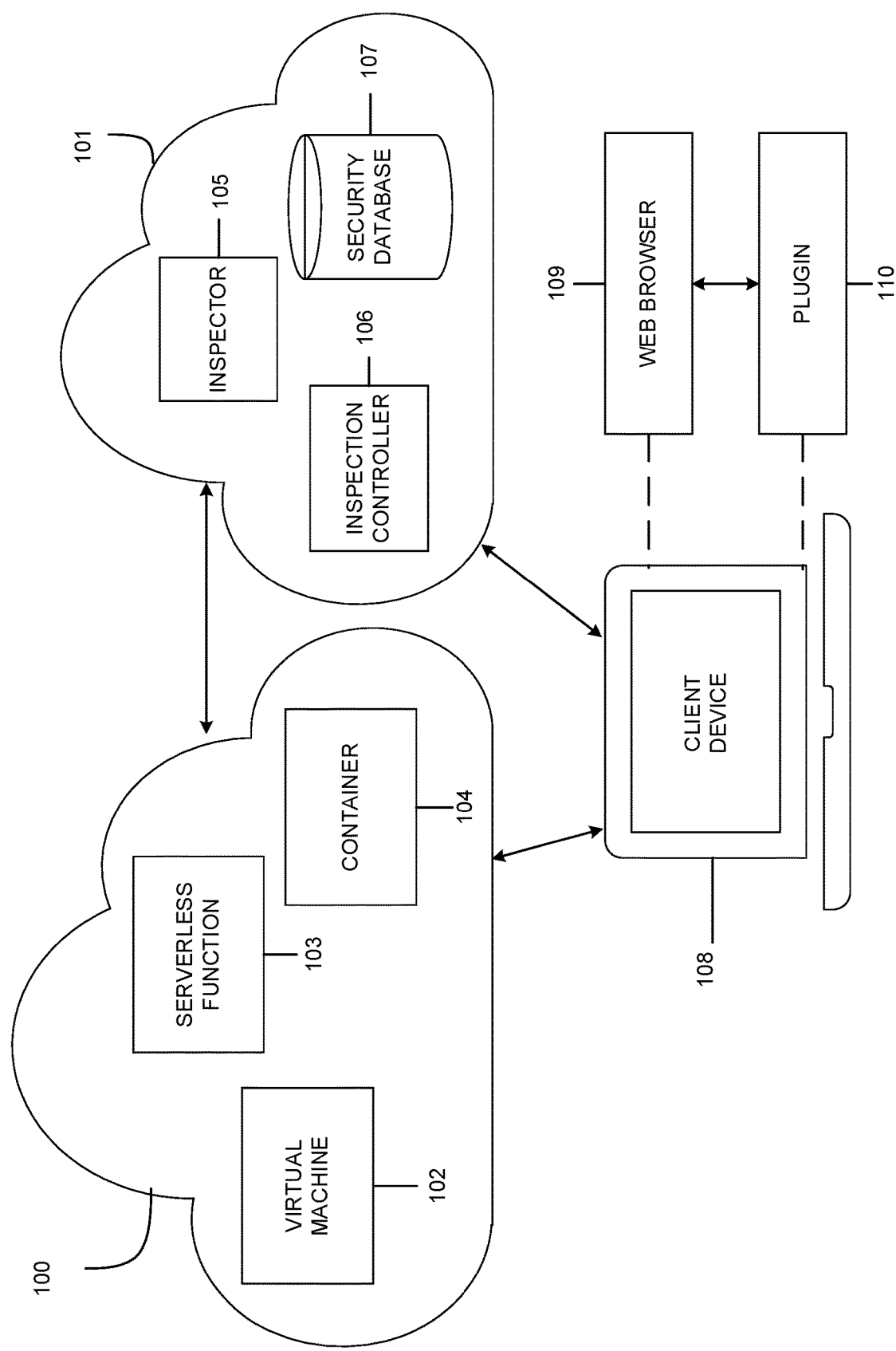
FIG. 1 is an example schematic illustration of a system for displaying a cybersecurity risk context of a first cloud environment, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a technique and method for detecting and displaying the cybersecurity risk context of a cloud environment utilizing non-invasive scanning processes.

FIG. 1 is an example schematic illustration of a system for displaying a cybersecurity risk context of a first cloud environment, utilized to describe an embodiment. In an embodiment, a cloud computing environment 100 includes cloud entities, such as resources, principals, and the like. In an embodiment, a resource includes access to a hardware resource of an environment, such as a processor, a memory, a storage, a combination thereof, and the like.

In some embodiments, a principal is an entity which is authorized to act on a resource. For example, in an embodiment, a principal is a user account, a service account, a role, a combination thereof, and the like.

In an embodiment, the cloud computing environment 100 is a virtual private cloud (VPC), a Virtual Network (VNet), a combination thereof, and the like. In some embodiments, the cloud computing environment 100 is implemented on a cloud computing infrastructure, such as Amazon® Web Services (AWS), Microsoft® Azure, Google® Cloud Platform (GCP), a combination thereof, and the like.

According to an embodiment, a cloud computing environment 100 includes resources such as a virtual machine 102, a serverless function 103, and a software container 104. In an embodiment, a virtual machine 102 is implemented as Oracle® VirtualBox®, and the like. In some embodiments, a serverless function 103 is an Amazon® Lambda® Function, and the like. In an embodiment, a software container 104 is implemented as a Docker® Engine, a Kubernetes® platform, a combination thereof, and the like.

In an embodiment, the computing environment 100 is a cloud computing environment, a networked computing environment, a hybrid computing environment, an on-prem computing environment, a combination thereof, and the like.

According to an embodiment, the cloud computing environment 100 is monitored, inspected, and the like, by an inspection environment 101. In an embodiment, the inspection environment 101 is configured to inspect the computing environment 100 for a cybersecurity object, a cybersecurity threat, a combination thereof, and the like. For example, according to an embodiment, a cybersecurity threat includes a cybersecurity risk, a misconfiguration, a vulnerability, an exposure, a combination thereof, and the like.

In some embodiments, a cybersecurity object is a software component, a software code, an application, an operating system, an image, a certificate, a password, a malware, a combination thereof, and the like.

In certain embodiments, the inspection environment 101 includes a plurality of inspectors, such as inspector 105, an inspection controller 106, and a security database 107. In an embodiment, an inspector 105 is implemented as a workload, resource, and the like, and is configured to detect a cybersecurity object. According to an embodiment, an inspector 105 is configured to detect a cybersecurity object, a plurality of cybersecurity objects, and the like.

In some embodiments, an inspection controller 106 is implemented as a workload, resource, and the like, and is configured to: detect a workload, resource, and the like, in the computing environment 100, generate a request to provision an inspector workload, assign an inspector 105 to inspect a workload of the computing environment 100, a combination thereof, and the like.

In certain embodiments, a security database 107 includes a representation of the computing environment 100. For example, according to an embodiment, the security database 107 is implemented as a graph database, such as Neo4j® and includes database constraints, a database schema, a data template, and the like, which is utilized in generating the representation of the computing environment 100.

For example, according to an embodiment, a representation includes generating a node in a graph to represent a resource, and generate a connection between nodes to represent a relationship between a first resource and a second resource, between a first resource and a first principal, between a first principal and a second principal, and the like.

In some embodiments, the security database 107 further includes enrichments, such as endpoint detection, representation of public network access, representation of a cybersecurity risk, representation of a remediation action, various combinations thereof, and the like. In an embodiment, each representation is generated based on a predefined data schema, which provides a unifying data model to represent multiple different cloud entities, entity types, etc. in a unified manner.

For example, according to an embodiment, each resource is represented as a resource entity, regardless of whether the resource is a virtual machine deployed in Azure, a virtual machine deployed in AWS, a software container utilizing Docker, a software container utilizing Kubernetes, etc.

In an embodiment, a client device 108 is configured to access the representation of the computing environment 100 stored in the security database 107. In some embodiment, the client device 108 is a computing device, including an I/O interface (e.g., a mouse, a keyboard, etc.), a display, a processor, a memory, a storage, and the like. In an embodiment, the client device 108 is a personal computer, a laptop, a desktop, a tablet computer, a smartphone, and the like.

According to an embodiment, the client device 108 includes a web browser 109. In an embodiment, the web browser 109 is configured to display web pages, hypertext markup language documents, and the like. In an embodiment, the web browser further includes a plugin 110 (also referred to as an extension). In an embodiment, a plugin 110 is implemented as software code, a software module, and the like, which is configured to communicate with a web browser 109 software, and provide additional functionality over the existing capability of the web browser 109.

For example, according to an embodiment, the plugin 110 is configured to generated an overlay, a toolbar, a combination thereof, and the like. In some embodiments, the overlay, toolbar, and the like, is generated based on a web page accessed by the web browser 109.

In an embodiment, the plugin 110 is configured to detect information from a web page requested by the web browser 109. In some embodiments, the plugin 110 is configured to only detect information from a web page associated with a predetermined domain, a list of predetermined domains, a predetermined IP address, a list of predetermined IP addresses, a combination thereof, and the like. For example, in an embodiment, a plugin 110 is configured to only read web pages requested through a URL having "aws" as a field in the URL.

In an embodiment, the plugin 110 is configured to parse a web page and detect values of predetermined data fields. For example, in an embodiment, a value is a unique identifier of a virtual machine, and the predetermined data field is a data field which indicates a name of the virtual machine, such as "VM name". Such an example is discussed in more detail with respect to FIG. 6 below.

For example, according to an embodiment, the plugin 110 is configured to read a document object model (DOM), detected data fields in the DOM, and extract values from the web page based on the detected data fields.

In certain embodiments, the plugin 110 is configured to provide a value from the web page, for example to the inspection environment 101. In other embodiments, the plugin 110 is configured to generate a query for the security database 107, based on the value which is detected in the web page. In certain embodiments, the plugin 110 is configured to generate a query for the security database 107 based on a query template, wherein the query is generated based on the detected value.

In an embodiment, the plugin 110 is configured to display a response received from the inspection environment 101, for example based on a generated query, in a display of the client device 108. For example, according to an embodiment, the plugin 110 is configured to update a toolbar, update an overlay, a combination thereof, and the like, based on a result received from executing a generated query on the security database 107.

In some embodiments, the plugin 110 is further configured to request login credentials from the client device 108 in order to access the security database 107. In an embodiment, the plugin 110 is configured to send a query to the inspection environment only in response to successfully authenticating a login credential provided to the plugin 110. In some embodiments, the plugin 110 configures the client device 108 to store thereon a token, a cookie, and the like, to indicate that a user session includes successfully authenticated login credentials.

Figure 2:
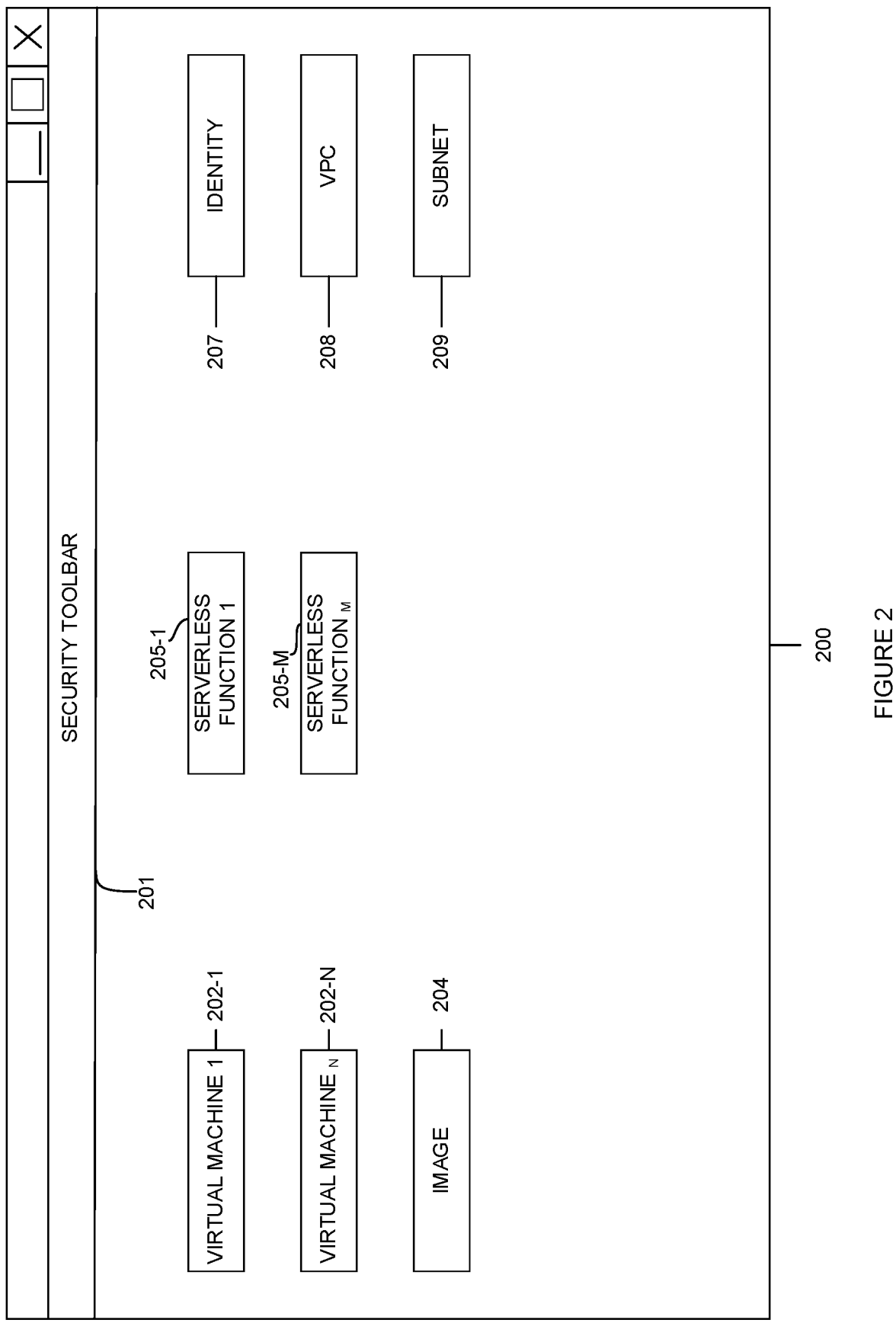
FIG. 2 is an example graphical representation of a browser including a security toolbar 201, utilized to describe an embodiment.

FIG. 2 is an example graphical representation of a browser 200 including a security toolbar 201, utilized to describe an embodiment. In an embodiment, browser 200 is configured to navigate to a webpage displaying various cloud entities, the cloud entities associated with a cloud computing environment, such as cloud computing environment 100, discussed in more detail in FIG. 1 above.

In some embodiments, a browser 200 is implemented as a software application running on top of an operating system, such as Google® Chrome®, Microsoft® Edge® browser, Mozilla® Firefox® browser, and the like.

In other embodiments, a browser 200 is implemented by embedding into the operating system, for example: the Android® browser embedded into the Android® OS, and the like.

In an embodiment, the displayed cloud entities are those deployed in a cloud computing environment. For example, in an embodiment, a web page is displayed on the browser 200, including a representation of a plurality of virtual machines 202-1 through 202-N, where 'NI' is an integer having a value of '2' or more.

In some embodiments, the web page displayed further includes an image 204, from which a workload is deployed. In certain embodiments, the web page includes a representation of a plurality of serverless functions 205-1 through 205-M, where CM' has a value of '2' or more.

According to an embodiment, the web page further includes a representation of an identity 207, a representation of a virtual private cloud 208, a representation of a subnet 209, a combination thereof, and the like.

In some embodiments, the web page representations are visual representations which are generated based on values of data fields of the web page. In an embodiment, a plugin, extension, and the like, is configured to read the web page, detect data fields, extract values from the detected data fields, and utilize the extracted values in generating a query for a security database.

In an embodiment, the plugin, extension, and the like, is configured to generate a visual representation, for example in the security toolbar 201. For example, in an embodiment, an identifier of virtual machine 202-1 and an identifier of serverless function 205-1 are extracted from the web page.

According to an embodiment, the plugin, extension, and the like, is configured to generate a query for a security database based on the extracted data field values (e.g., the extracted names). In some embodiments, the extracted values are provided to a security database, which is configured to generate a query based on the sent extracted data field values.

In an embodiment, a query is executed on the security database including the extracted values from the web page. In some embodiments, a response is received from the security database, wherein the response includes an identified cybersecurity risk. For example, in an embodiment, an inspector is configured to inspect the virtual machine 202-1 for a cybersecurity risk.

In response to detecting the cybersecurity risk on the virtual machine 202-1, the inspector is configured, according to an embodiment, to update a representation of the virtual machine 202-1 in the security database to indicate that the virtual machine 202-1 includes a cybersecurity risk.

In an embodiment, a result is received from the security database to indicate that a cybersecurity risk is detected on the virtual machine 202-1. In some embodiments, the plugin, extension, and the like, is further configured to display an aggregate value. For example, in an embodiment, the security toolbar 201 includes a representation indicating a number of vulnerabilities detected having a high priority, a number of vulnerabilities detected having a medium priority, a number of vulnerabilities having a low priority, a combination thereof, and the like.

According to an embodiment, upon navigation to such a webpage, the plugin, extension, and the like, is configured to update the security toolbar 201 to provide a cybersecurity context for the entirety of the cloud environment represented by the associated assets displayed on the webpage (e.g., by detecting entity identifiers and querying a security database to detect issues indicated in the security database respective of the detected entities).

Generating a toolbar, an overlay, and the like, which provides cybersecurity context to a representation of a cloud environment is advantageous, as this provides a user with an engaging experience which is unobstructive. Furthermore, according to an embodiment, such a representation of the cybersecurity context allows conveying more information to a user in an efficient manner.

Figure 3:
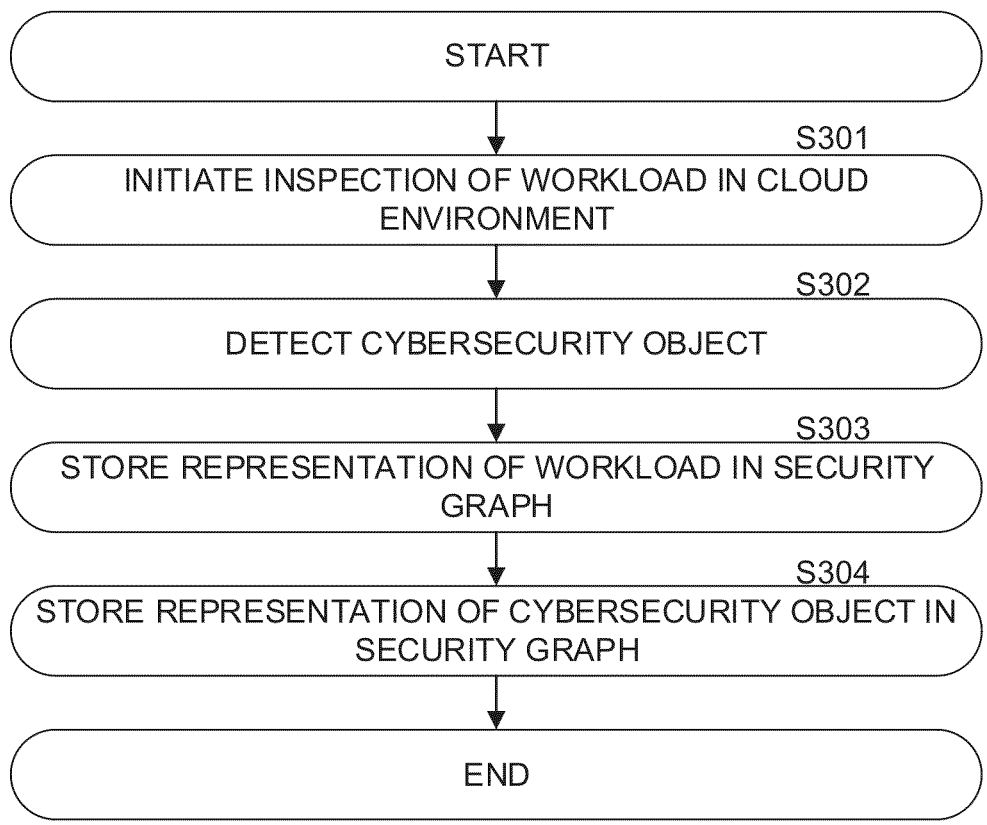
FIG. 3 is an example of a flowchart of a method for detecting cybersecurity objects within a cloud computing environment, utilized to describe an embodiment.

FIG. 3 is an example of a flowchart of a method for detecting cybersecurity objects within a cloud computing environment, utilized to describe an embodiment. In an embodiment, detecting cybersecurity objects in a resource, workload, and the like, of a cloud computing environment is an indication of a cybersecurity risk, a vulnerability, an exposure, a combination thereof, and the like.

At S301, inspection of a workload in a cloud environment is initiated. In an embodiment, an inspection controller, such as inspection controller 106, configures an inspector, such as inspector 105, as an inspection workload to enable the inspector 105 to inspect for cybersecurity objects within a cloud computing environment, such as computing environment 100.

According to an embodiment, a workload is a virtual machine, a software container, a serverless function, a combination thereof, and the like. In some embodiments, a cybersecurity object is a software application, a software application type, an operating system, an operating system type, a certificate, an encryption key, a password, a hash value, a user identifier, a registry file, a binary, a library, a combination thereof, and the like.

At S302, a cybersecurity object is detected. In an embodiment, the cybersecurity object is detected on a workload deployed in a cloud environment. For example, according to an embodiment, an inspection controller is configured to generate an inspectable disk based on, for example a clone, a copy, a snapshot, and the like, of a disk associated with a workload. In an embodiment, the inspectable disk is inspected for the cybersecurity object.

In an embodiment, an inspector is configured to detect a single cybersecurity object, a plurality of cybersecurity objects, and the like. In some embodiments, a first inspector is configured to detect a first cybersecurity object in a workload, and a second inspector is configured to detect a second cybersecurity object in the workload, which is not the first cybersecurity object.

At S303, a representation of a workload is stored in security database. According to an embodiment, the security database is implemented as a security graph, for example utilizing Node4j®.

In an embodiment, a security database can be realized as a security database 107. In certain embodiments, a representation of an inspected workload is stored in the security database, the representation including information detected in the inspected workload, the workload parameters (e.g., metadata, a combination thereof, and the like. In some embodiments, the representation is generated based on a predefined data schema. For example, in an embodiment, a virtual machine is represented by a node in a security graph, wherein the node is utilized to represent a resource in the security graph.

According to an embodiment, elements comprising the security graph are represented as nodes and vertices, the nodes representing a detected cybersecurity object of a plurality of cybersecurity objects present in an inspected cloud environment.

For example, a first node representing a detected cybersecurity object is connected to a vertex which is connected at the other end to another node, the another node representing a different detected cybersecurity object which has a relationship to the cybersecurity object represented by the first node.

In this way, a security graph displaying the relationship between cybersecurity objects in a cloud environment is able to be constructed out of a plurality of nodes and a plurality of vertices.

At S304, a representation of a detected cybersecurity object is stored in a security graph.

According to an embodiment, a representation of a detected cybersecurity object, for example an object such as the one detected in S302, is stored in a security graph. The representation of the detected cybersecurity object is associated with a representation of the workload on which the cybersecurity object is detected.

In an embodiment, a representation of a detected cybersecurity object includes: the object's unique identifier as it exists in the cloud environment (e.g., a software application identifier, a version identifier, etc.), the object's intrinsic type property (such as an executable, readable file, and the like), the object's metadata, the object's hash signature, a combination thereof, and the like.

In an embodiment, the security database includes a representation of a computing environment, such as a cloud computing environment, which can be queried to detect cybersecurity risks, vulnerabilities, exposures, and the like, on a specific workload, for a specific subnet, for an entire computing environment, a combination thereof, and the like.

Figure 4:
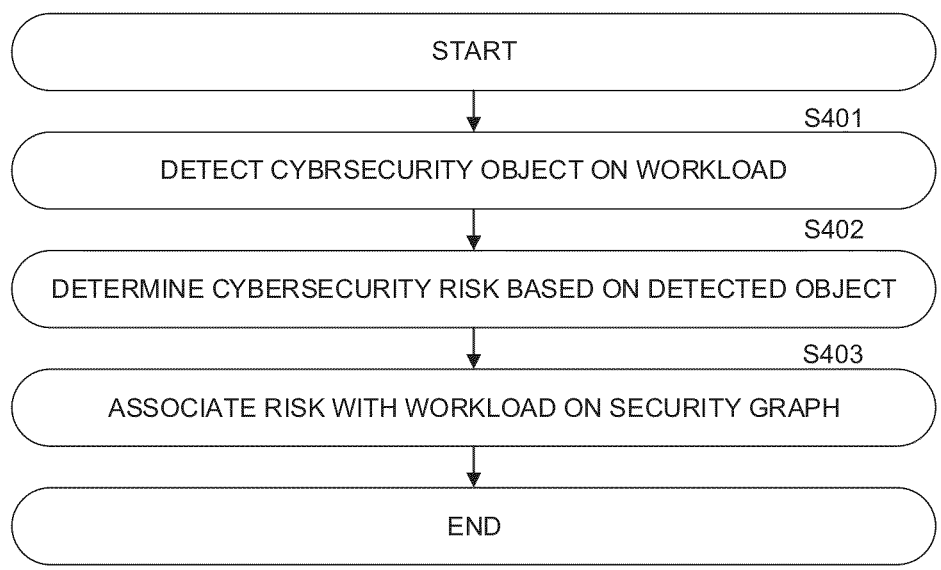
FIG. 4 is an example of a flowchart of a method for detecting a cybersecurity risk of a cloud environment, utilized to describe an embodiment.

FIG. 4 is an example of a flowchart of a method for detecting a cybersecurity risk of a cloud environment, utilized to describe an embodiment.

At S401, a cybersecurity object is detected on a workload. In an embodiment, the cybersecurity object is detected on a resource, a workload, and the like. For example, according to an embodiment, a workload is inspected by an inspector configured to detect the cybersecurity object.

In some embodiments, the cybersecurity object is a software application, a software application type, an operating system, an operating system type, a certificate, an encryption key, a password, a hash value, a user identifier, a registry file, a binary, a library, a combination thereof, and the like.

In an embodiment, the cybersecurity object is detected on the workload, for example utilizing the method described in more detail with respect to FIG. 3 above. For example, in an embodiment, an inspector workload is configured to detect the cybersecurity object on an inspectable disk, wherein the inspectable disk is generated based on a disk associated with the workload.

According to an embodiment, the inspectable disk is generated based on a clone, a copy, a snapshot, and the like, of a disk associated with the workload. In an embodiment, the inspector is configured to release a resource associated with the inspectable disk, in response to determining that inspection of the inspectable disk is complete.

At S402, a cybersecurity risk is determined. In an embodiment, the cybersecurity risk is determined based on the detected cybersecurity object. For example, according to an embodiment, a first object detected on a workload is a software application version. In an embodiment, the first object indicates that the workload is vulnerable, where there is a known vulnerability associated with the software application version detected by the inspector. A known vulnerability is detected, for example, by utilizing the Common Vulnerability and Exposure (CVE) database.

In some embodiments, the cybersecurity risk is determined based on detecting a plurality of cybersecurity objects. For example, in an embodiment, detecting a database executed on a workload, and another software having a known vulnerability, allow together to provide unintended access to the database, thereby creating an exposure. In an embodiment, a combination of cybersecurity objects indicates a cybersecurity risk, indicates a severity of a cybersecurity risk, a combination thereof, and the like.

In an embodiment, a cybersecurity risk determination is a qualitative evaluation of a plurality of cybersecurity object attributes, for example: the type of detected object, the object's connectedness to other objects in the cloud environment, the criticality of the object to the stability of the overall cloud environment, a combination thereof, and the like.

In some embodiments, a cybersecurity severity score is determined. For example, in an embodiment, a cybersecurity object of a first type, and a cybersecurity object of a second type, both detected on a single workload, indicate a higher severity of cybersecurity risk, than either cybersecurity object by itself.

At S403, a cybersecurity risk is associated with a workload. In an embodiment, the cybersecurity risk is represented in a security database. For example, in an embodiment, the cybersecurity risk is represented as a node in a security graph, as a data field, a data field value, and the like, in a security database, a combination thereof, and the like.

In some embodiments, the cybersecurity risk is represented as metadata associated with a representation of the workload on which the cybersecurity risk is detected, on a representation of the workload on which the cybersecurity object was detected, and the like.

According to an embodiment, a security graph provides the ability to store a cybersecurity risk evaluation as a node and connect it to another node already present in the security graph which represents the inspection workload from whence the cybersecurity objects detected and utilized to reach the risk determination hailed, via a vertex.

Figure 5A:
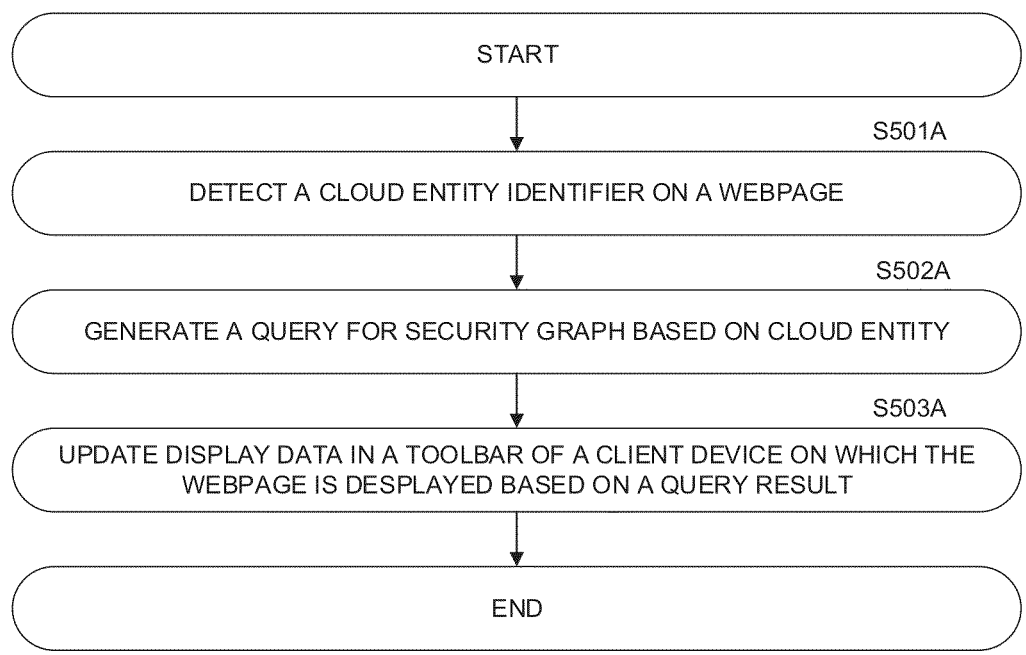
FIG. 5A is an example flowchart of a method for rendering a cybersecurity risk context via a toolbar plugin, implemented in accordance with an embodiment.

FIG. 5A is an example flowchart of a method for rendering a cybersecurity risk context via a toolbar plugin, implemented in accordance with an embodiment. In an embodiment, a plugin, an extension, an add-on, and the like, are utilized to describe various software components, software code, combinations thereof, and the like, which extend a basic functionality of another software application, such as a web browser.

For example, according to an embodiment, a web browser extension is configured to detect identifiers of entities of a computing environment in a web page, initiate a query based on the detected identifiers with a security graph, the security graph including a representation of the computing environment, and render a result of the query through the web browser, for example as a toolbar.

At S501A, a cloud entity identifier is detected. In an embodiment, the cloud entity identifier is detected on a webpage. In some embodiments, a cloud entity is realized as an entity name, a unique identifier, a hash, an alias, an IP address, or the like.

According to an embodiment, detection of a cloud entity identifier utilizes a web scraping technique, an analysis of page information as the page is loading, reading of a markup language (for example: HTML) document, packet inspection, the web page's Document Object Model (DOM), a combination thereof, and the like. In some embodiments, a plurality of different cloud identifiers are detected.

At S502A, a query is generated. According to an embodiment, the query is generated based on a query template. For example, in an embodiment, a pre-existing query template is modified based on a detected cloud entity identifier.

In an embodiment, the query is executed on a security database, wherein the security database includes a representation of the cloud computing environment in which the cloud entity associated with the cloud entity identifier, is deployed.

In certain embodiments, a query is generated using: structured query language, natural language processing, or the like.

According to an embodiment, a detected cloud entity identifier, such as an identifier detected at S501A, is used to construct, modify, adapt, etc., a query which is then executed on a security database.

In an embodiment, the executed query returns a query response. According to an embodiment, the query response includes information, data, and the like, pertaining to the detected cloud entity corresponding to the identifier utilized in the query.

In an embodiment, the query response includes a location of the entity within the cloud environment, an exposure of the entity to other entities in the cloud environment, an exposure of the entity, a cybersecurity risk associated with the entity, a cybersecurity object associated with the entity, an aggregate value indicating a number of cybersecurity risks, vulnerabilities, misconfigurations, exposures, and the like, an aggregate value indicating a number of workloads having a first severity score, a number of workloads having a second severity score, a calculated qualitative risk score of the entity as described in FIG. 4 at S402, a combination thereof, and the like.

At S503A, a toolbar display is updated. In an embodiment, a received query result is utilized to update the displayed data in a toolbar of a client device on which the webpage is displayed.

In some embodiments, a toolbar includes a plurality of data fields, each data field corresponding to a predetermined metric. For example, according to an embodiment, a metric is a number of workloads having a certain vulnerability, an aggregate number of workloads having a first vulnerability, an aggregate number of workloads having a second vulnerability, an aggregate number of workloads having vulnerabilities with a first severity score, an aggregate number of workloads having vulnerabilities with a second severity score, a combination thereof, and the like.

In an embodiment, the toolbar is configured to display a calculated risk profile of the cloud environment represented by the detected identifiers on the webpage currently being displayed. In an embodiment, the calculated risk profile is a qualitative assessment generated through inspection of the detected cybersecurity objects within the cloud environment, for example as described in FIG. 3.

In certain embodiments, the toolbar display is updated periodically, continuously, and the like. In some embodiments, the toolbar includes a link, a URL, and the like, which direct the web browser to a web page of an inspection environment, wherein the web page of the inspection environment is configured to display further information relating to a cybersecurity issue detected on a specific workload.

Figure 5B:
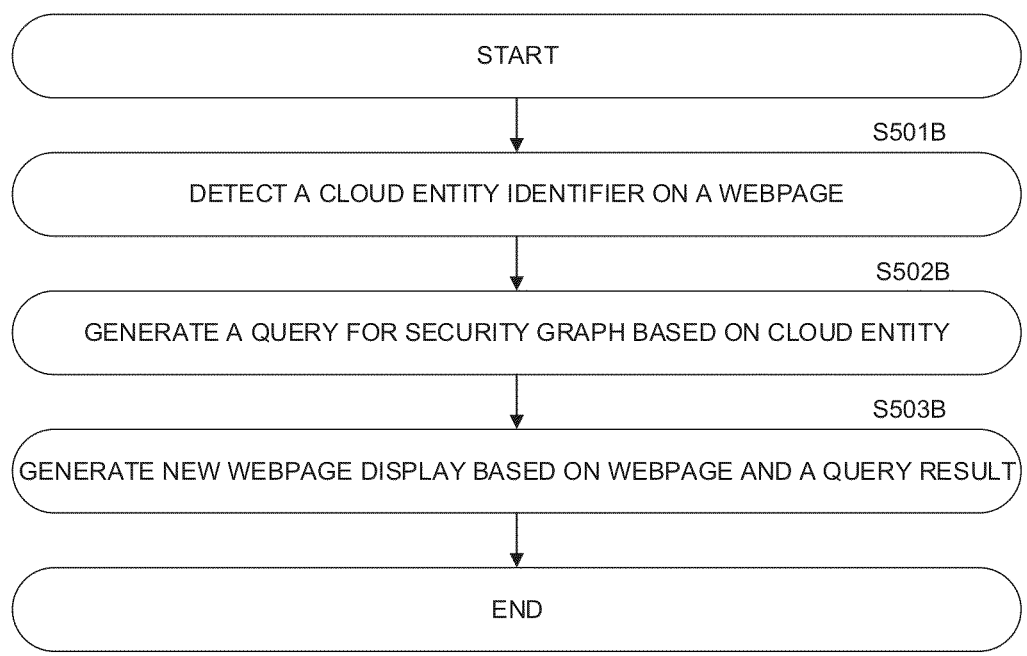
FIG. 5B is an example flowchart of a method for rendering a cybersecurity risk context via updating a webpage display, implemented according to an embodiment.

FIG. 5B is an example flowchart of a method for rendering a cybersecurity risk context via updating a webpage display, implemented according to an embodiment.

At S501B, a cloud entity identifier is detected. In an embodiment, the cloud entity identifier is detected on a webpage. In some embodiments, a cloud entity is realized as an entity name, a unique identifier, a hash, an alias, an IP address, or the like.

According to an embodiment, detection of a cloud entity identifier utilizes a web scraping technique, an analysis of page information as the page is loading, reading of a markup language (for example: HTML) document, packet inspection, the web page's Document Object Model (DOM), a combination thereof, and the like. In some embodiments, a plurality of different cloud identifiers are detected.

At S502B, a query is generated. According to an embodiment, the query is generated based on a query template. For example, in an embodiment, a pre-existing query template is modified based on a detected cloud entity identifier.

In an embodiment, the query is executed on a security database, wherein the security database includes a representation of the cloud computing environment in which the cloud entity associated with the cloud entity identifier, is deployed.

In certain embodiments, a query is generated using: structured query language, natural language processing, or the like.

According to an embodiment, a detected cloud entity identifier, such as an identifier detected at S501B, is used to construct, modify, adapt, etc., a query which is then executed on a security database.

In an embodiment, the executed query returns a query response. According to an embodiment, the query response includes information, data, and the like, pertaining to the detected cloud entity corresponding to the identifier utilized in the query.

In an embodiment, the query response includes a location of the entity within the cloud environment, an exposure of the entity to other entities in the cloud environment, an exposure of the entity, a cybersecurity risk associated with the entity, a cybersecurity object associated with the entity, an aggregate value indicating a number of cybersecurity risks, vulnerabilities, misconfigurations, exposures, and the like, an aggregate value indicating a number of workloads having a first severity score, a number of workloads having a second severity score, a calculated qualitative risk score of the entity as described in FIG. 4 at S402, a combination thereof, and the like.

At S503B, a webpage display is updated. In an embodiment, a received query result is utilized to update the webpage. For example, in an embodiment, updating a webpage includes generating a new webpage based on the received result of executing a query on the security database, generating an iframe in an existing webpage, generating an overlay over an existing webpage, a combination thereof, and the like.

In some embodiments, an updated webpage display includes a plurality of data fields, each data field corresponding to a predetermined metric. For example, according to an embodiment, a metric is a number of workloads having a certain vulnerability, an aggregate number of workloads having a first vulnerability, an aggregate number of workloads having a second vulnerability, an aggregate number of workloads having vulnerabilities with a first severity score, an aggregate number of workloads having vulnerabilities with a second severity score, a combination thereof, and the like.

In an embodiment, the updated webpage display is configured to display a calculated risk profile of the cloud environment represented by the detected identifiers on the webpage currently being displayed. In an embodiment, the calculated risk profile is a qualitative assessment generated through inspection of the detected cybersecurity objects within the cloud environment, for example as described in FIG. 3.

In certain embodiments, the updated webpage display is updated periodically, continuously, and the like. In some embodiments, the updated webpage display includes a link, a URL, and the like, which direct the web browser to a web page of an inspection environment, wherein the web page of the inspection environment is configured to display further information relating to a cybersecurity issue detected on a specific workload.

Figure 6:
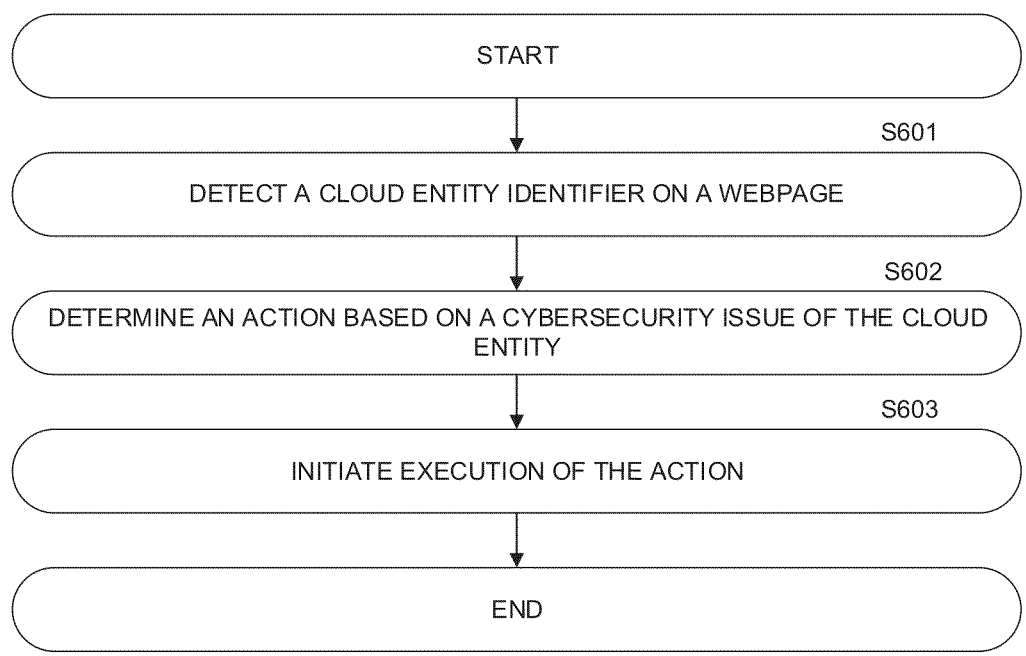
FIG. 6 is an example flowchart of a method for initiating an action through a browser extension, implemented in accordance with an embodiment.

FIG. 6 is an example flowchart of a method for initiating an action through a browser extension, implemented in accordance with an embodiment. In an embodiment, the action includes generation, execution, and the like, of a computer instruction, implemented for example as software, firmware, middleware, microcode, hardware description language, dynamic language, a combination thereof, and the like.

At S601, a cloud entity identifier is detected. According to an embodiment, the cloud entity identifier is detected in a webpage by an extension, a plugin, and the like, configured to so detect. Detection of a cloud entity identifier is discussed in more detail throughout.

In an embodiment, the cloud entity identifier is utilized to query a security database to detect a representation of the cloud entity having the cloud entity identifier. In some embodiments, the a query is utilized to detect in the security database additional entities, representations, and the like, which are connected to the representation of the cloud entity. For example, in an embodiment, the query is directed to the security database to detect another entity connected to the representation of the cloud entity, to detect a cybersecurity object representation connected to the representation of the cloud entity, to detect a cybersecurity threat, to detect a cybersecurity risk, a combination thereof, and the like.

In some embodiments, an extension, a plugin, and the like, is configured to detect a cloud entity identifier and send the detected identifier to an inspection environment which is configured to generate a query for a security database, wherein the security database includes a representation of the computing environment in which the cloud entity is deployed.

In certain embodiments, the extension, the plugin, and the like, is configured to detect the cloud entity identifier, and generate a query which is provided to the security database for execution. In an embodiment, the query is generated based on the cloud entity identifier, and a predefined query template, a group of predefined query templates, a combination thereof, and the like.

According to an embodiment, the query is configured to return a result indicating a cybersecurity issue associated with the cloud entity of the cloud entity identifier. For example, in an embodiment, the cybersecurity issue is a threat, a risk, a vulnerability, an exposure, a misconfiguration, a combination thereof, and the like.

At S602, an action is determined for the cloud entity. In an embodiment, the action is determined based on a returned result which is received in response to executing a query on a security database, wherein the query includes the cloud entity identifier.

In some embodiments, the action includes initiating an action, generating an instruction to initiate an action, a combination thereof, and the like. In an embodiment, the action includes determining a remediation action based on a cybersecurity issue, determining a plurality of remediation actions based on the cybersecurity issue, generating a visual representation of a recommendation of a remediation action, a combination thereof, and the like.

In some embodiments, the action includes receiving a selection of a remediation action. In an embodiment, the extension, plugin, and the like, is further configured to generate a textual input (e.g., a textbox), into which a text input is received.

In an embodiment, a textual input is received, such as a structured query language input, a natural language input, a cloud entity identifier, a combination thereof, and the like. In certain embodiments, the textual input is utilized as a prompt for a large language model (LLM). In some embodiments, the prompt further includes a database schema of the security database.

In certain embodiments, the prompt is generated based on the textual input, the cloud identifier, a predetermined prompt template, a combination thereof, and the like. For example, according to an embodiment, a textual input is received through a browser extension. The browser extension is configured to send the textual input to an inspection environment, where the textual input is provided to an LLM, for example as part of a prompt. In an embodiment, the LLM is configured to generate an output based on the prompt, such as generating a recommended remediation action, generating a query for a security database, a combination thereof, and the like.

At S603, the action is executed. In an embodiment, an action, a plurality of actions, and the like, are executed. In certain embodiments, actions are continuously determined and executed. For example, in an embodiment, actions are continuously determined and executed during a single browsing session.

In some embodiments, executing an action includes initiating an action in a cloud environment, in an inspection environment, a combination thereof, and the like. In certain embodiments, executing an action includes generating an instruction which when executed configures a workload, such as a virtual machine, serverless function, software application, and the like, to perform the action.

Figure 7:
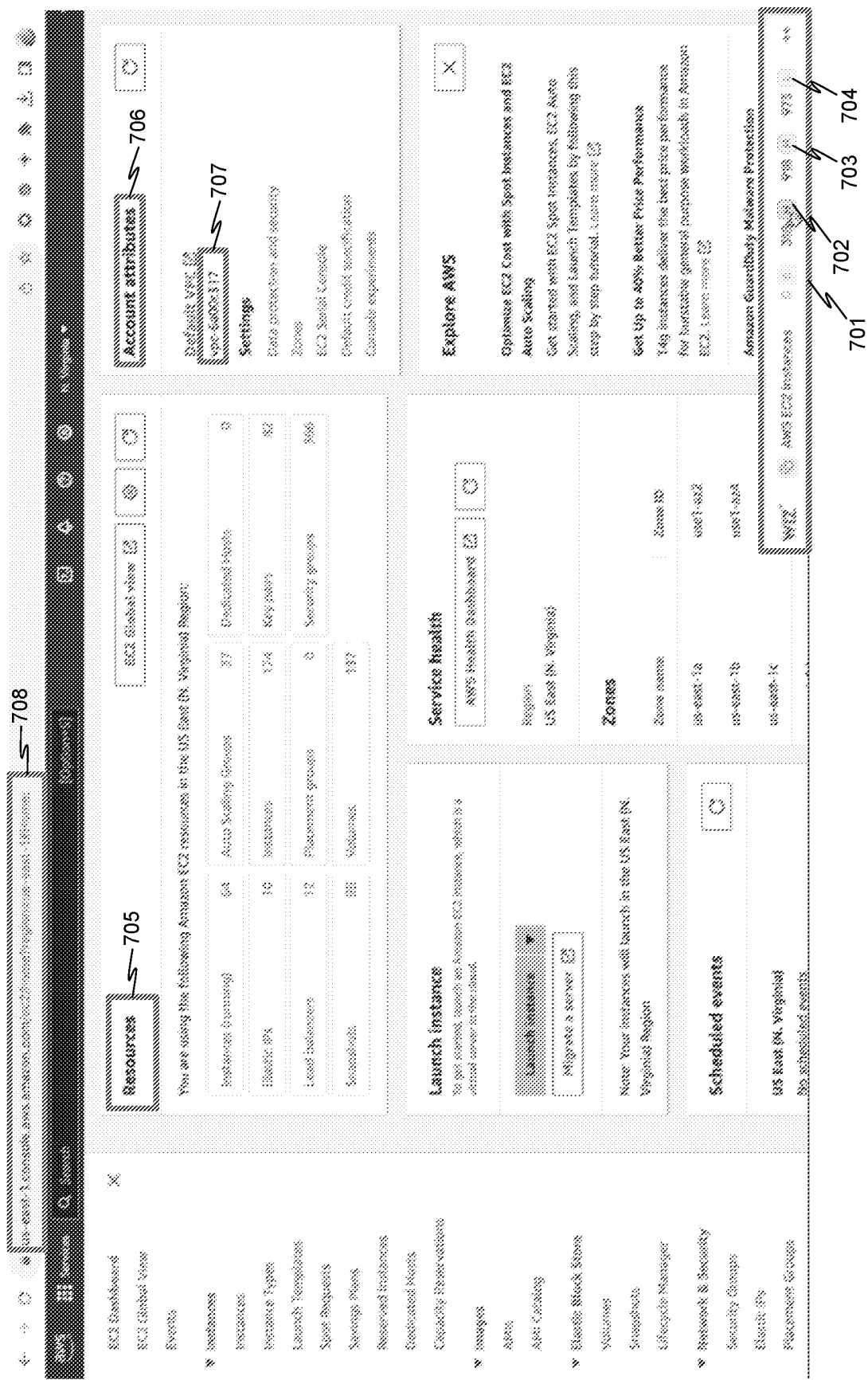
FIG. 7 is an example graphical interface of a web page including a cybersecurity toolbar extension, implemented according to an embodiment.

FIG. 7 is an example graphical interface of a web page including a cybersecurity toolbar extension, implemented according to an embodiment. According to an embodiment, a web browser is configured to display a web page, for example based on a uniform resource locator (URL) 708. In an embodiment, the web page includes a plurality of data field identifiers, such as resources tab 705, account attributes tab 706, and the like.

In an embodiment, data field values are extracted from each tab, each data field, and the like. For example, resource tab 705 includes a data field indicating resources, such as running instances, load balancers, volumes, and the like. In an embodiment, each such value is utilized in querying a security database. Such data field values (e.g., "volumes") are utilized in filtering a query result.

In some embodiments, data field values provide a unique identifier of a cloud entity. For example, in an embodiment, the account attributes tab 706 includes a data field "Default VPC" (e.g., a VPC cloud entity) having a first value 707 (e.g., vpc-6a00c317). In an embodiment, the first value 707 is utilized to query a security database to detect a representation of a resource (e.g., based on the resource tab 705) of the cloud entity (e.g., the VPC).

In certain embodiments, an extension, plugin, and the like, is configured to generate a security toolbar 701. In an embodiment, the security toolbar 701 is generated as an iframe, as an overlay, as a window, a combination thereof, and the like. In some embodiments, the security toolbar 701 includes visual representations, such as icons, and values associated with the visual representation.

For example, in an embodiment, a first visual representation 702 indicates a number of resources in the VPC having vulnerabilities which are ranked as high severity, a second visual representation 703 indicates a number of resources in the VPC having vulnerabilities which are ranked as medium severity, and a third visual representation 704 indicates a number of resources in the VPC having vulnerabilities which are ranked as low severity.

Figure 8:
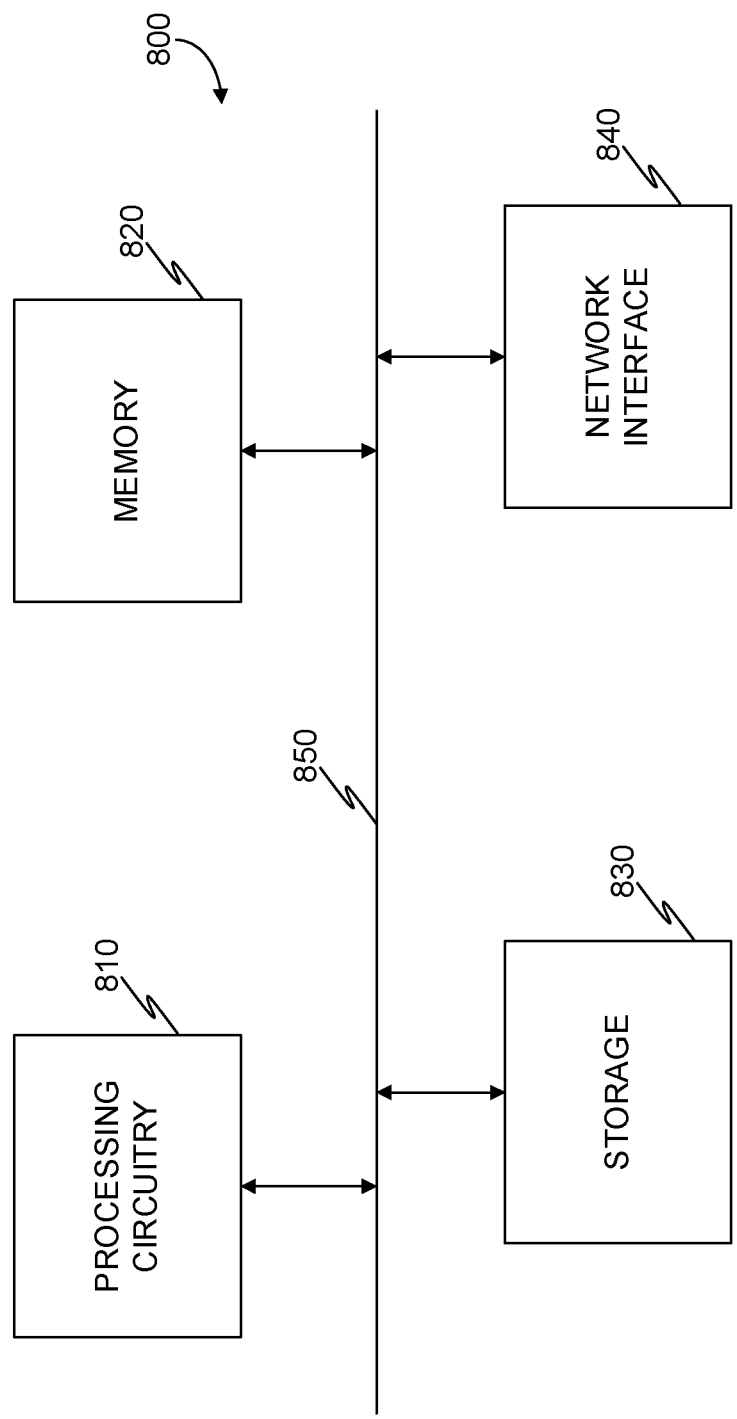
FIG. 8 is an example schematic diagram of a system according to an embodiment.

FIG. 8 is an example schematic diagram of a system 800 according to an embodiment. The system 800 includes a processing circuitry 810 coupled to a memory 820, a storage 830, and a network interface 840. In an embodiment, the components of the system 800 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof. In an embodiment, the memory 820 is an on-chip memory, an off-chip memory, a combination thereof, and the like. In certain embodiments, the memory 820 is a scratch-pad memory for the processing circuitry 810.

In one configuration, software for implementing one or more embodiments disclosed herein may be stored in the storage 830, in the memory 820, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 810 to perform the various processes described herein.

The storage 830 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 840 is configured to provide connectivity with, for example, the computing environment 100, the inspection environment 101, various workloads deployed therein, and the like.

It should be understood that various workloads can be implemented utilizing the architecture described above, such as the virtual machine 102, the serverless function 103, the software container 104, the inspector 105, the inspection controller 106, the security database 107, the client device 108, a combination thereof, and the like.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

The invention claimed is:
1. A method for rendering a cybersecurity context based on a detected web page, comprising:
    detecting in a web page a plurality of identifiers, each identifier corresponding to a cloud entity deployed in a cloud computing environment;

initiating a query for a security database based on an identifier of the plurality of identifiers, wherein the security database includes a representation of the cloud computing environment;

executing the query on the security database to return a response, wherein the response includes a cybersecurity risk; and rendering a representation of the cybersecurity risk on a display associated with the web page based on the response.

2. The method of claim 1, further comprising:
rendering the representation of the cybersecurity risk on a security toolbar.

3. The method of claim 1, further comprising:
rendering the representation of the cybersecurity risk as a webpage overlay.

4. The method of claim 1, further comprising:
determining a remediation action based on the cybersecurity risk.

5. The method of claim 4, further comprising:
initiating the remediation action in the cloud computing environment.

6. The method of claim 1, further comprising:
extracting a data field value associated with an identifier of the plurality of identifiers.

7. The method of claim 6, further comprising:
generating the query based on the extracted data field value.

8. The method of claim 1, further comprising:
configuring a client device displaying the web page to install an extension, wherein the extension is configured to perform detecting in the web page the plurality of identifiers.

9. The method of claim 1, further comprising:
generating the query based on a first identifier of the plurality of identifiers, wherein the query includes a filter based on a second identifier of the plurality of identifiers.

10. A non-transitory computer-readable medium storing a set of instructions for rendering a cybersecurity context based on a detected web page, the set of instructions comprising:

one or more instructions that, when executed by one or more processors of a device, cause the device to:

detect in a web page a plurality of identifiers, each identifier corresponding to a cloud entity deployed in a cloud computing environment;

initiate a query for a security database based on an identifier of the plurality of identifiers, wherein the security database includes a representation of the cloud computing environment;

execute the query on the security database to return a response, wherein the response includes a cybersecurity risk; and render a representation of the cybersecurity risk on a display associated with the web page based on the response.

11. A system for rendering a cybersecurity context based on a detected web page comprising:
a processing circuitry;

a memory, the memory containing instructions that, when executed by the processing circuitry, configure the system to:

detect in a web page a plurality of identifiers, each identifier corresponding to a cloud entity deployed in a cloud computing environment;

initiate a query for a security database based on an identifier of the plurality of identifiers, wherein the security database includes a representation of the cloud computing environment;

execute the query on the security database to return a response, wherein the response includes a cybersecurity risk; and render a representation of the cybersecurity risk on a display associated with the web page based on the response.

12. The system of claim 11, wherein the memory contains further instructions which when executed by the processing circuitry further configure the system to:
render the representation of the cybersecurity risk on a security toolbar.

13. The system of claim 11, wherein the memory contains further instructions which when executed by the processing circuitry further configure the system to:
render the representation of the cybersecurity risk as a webpage overlay.

14. The system of claim 11, wherein the memory contains further instructions which when executed by the processing circuitry further configure the system to:
determine a remediation action based on the cybersecurity risk.

15. The system of claim 14, wherein the memory contains further instructions which when executed by the processing circuitry further configure the system to:
initiate the remediation action in the cloud computing environment.

16. The system of claim 11, wherein the memory contains further instructions which when executed by the processing circuitry further configure the system to:
extract a data field value associated with an identifier of the plurality of identifiers.

17. The system of claim 16, wherein the memory contains further instructions which when executed by the processing circuitry further configure the system to:
generate the query based on the extracted data field value.

18. The system of claim 11, wherein the memory contains further instructions which when executed by the processing circuitry further configure the system to:
configure a client device displaying the web page to install an extension, wherein the extension is configured to perform detecting in the web page the plurality of identifiers.

19. The system of claim 11, wherein the memory contains further instructions which when executed by the processing circuitry further configure the system to:
generate the query based on a first identifier of the plurality of identifiers, wherein the query includes a filter based on a second identifier of the plurality of identifiers.

* * * * *